United States Patent [19]

Wong

[11] Patent Number: 5,225,877
[45] Date of Patent: Jul. 6, 1993

[54] LOW COST AND HIGH PRECISION SCHEME FOR PHOTORECEPTOR BELT STEERING CONTROL

[75] Inventor: Lam F. Wong, Fairport, N.Y.

[73] Assignee: Xerox Corporation, Stamford, Conn.

[21] Appl. No.: 896,847

[22] Filed: Jun. 12, 1992

[51] Int. Cl.$^5$ .................. G03G 21/00; G03G 15/00; G03G 13/00
[52] U.S. Cl. .................................................. 355/212
[58] Field of Search ............................... 355/211, 212

[56] References Cited

U.S. PATENT DOCUMENTS

| | | | |
|---|---|---|---|
| 4,061,222 | 12/1977 | Rushing | 198/807 |
| 4,170,175 | 10/1979 | Conlon, Jr. | 355/212 X |
| 4,174,171 | 11/1979 | Hamaker et al. | 355/212 |
| 4,344,693 | 8/1982 | Hamaker | 355/212 |
| 4,429,985 | 2/1984 | Yokota | 355/212 |
| 4,462,676 | 7/1984 | Shimura et al. | 355/212 X |
| 4,483,607 | 11/1984 | Nagayama | 355/212 |
| 4,527,686 | 7/1985 | Satoh | 355/212 X |
| 4,547,059 | 10/1985 | Nagayama et al. | 355/212 |
| 4,572,417 | 2/1986 | Joseph et al. | 226/20 |
| 4,657,372 | 4/1987 | Ikeda et al. | 355/212 |
| 4,961,089 | 10/1990 | Jamzadeh | 355/212 X |

*Primary Examiner*—Fred L. Braun
*Attorney, Agent, or Firm*—Oliff & Berridge

[57] ABSTRACT

A control method and apparatus for tracking an endless belt. The tracking apparatus includes a roller and a belt steering roller. A span of the belt defined between the roller and the belt steering roller travels in a plane and both the roller and the belt steering roller are adapted for rotational movement about longitudinal axes perpendicular to the plane. The belt steering roller is also capable of a tilting movement through a midpoint of the belt steering roller in a soft tilt axis intersecting the longitudinal axis. A tilting mechanism including a solenoid and a spring controls movement of a yoke for tilting the steering roller about the soft tilt axis to either a positively tilted position relative to the plane or to a negatively tilted position relative to the plane. An optical sensor senses the lateral position of the belt and produces an electrical signal representing the lateral position. The electrical signal is analyzed and a first and a second time period are determined, these first and second time periods form a time duration ratio for keeping the steering roller at the negatively and positively tilted positions. A microprocessor control activates the tilting mechanism to move the steering roller to one of the two predetermined positions based on the electrical signal for the first time period. Subsequently, the tilting mechanism is activated to move to the other position after elapse of the first time period. The steering roller remains at the other position for the second time period.

11 Claims, 4 Drawing Sheets

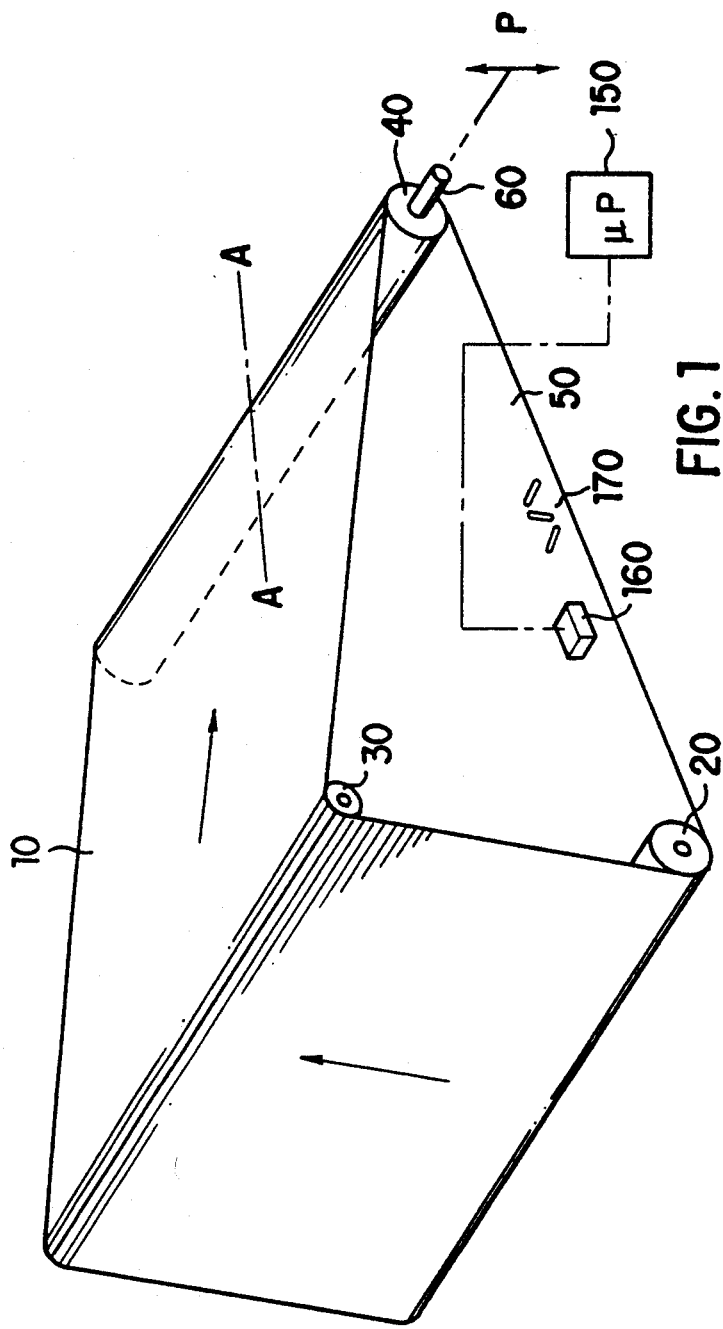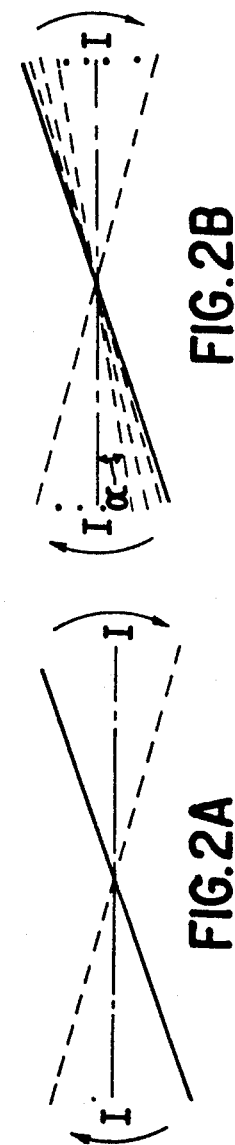

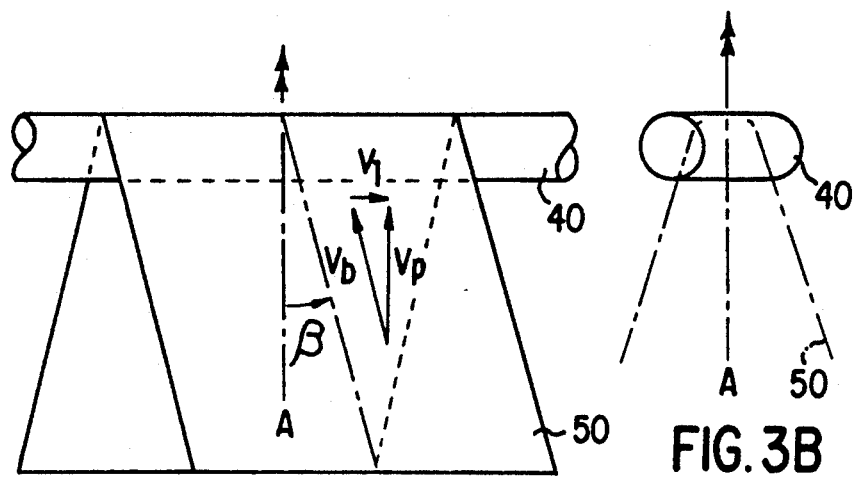
FIG. 3A
FIG. 3B
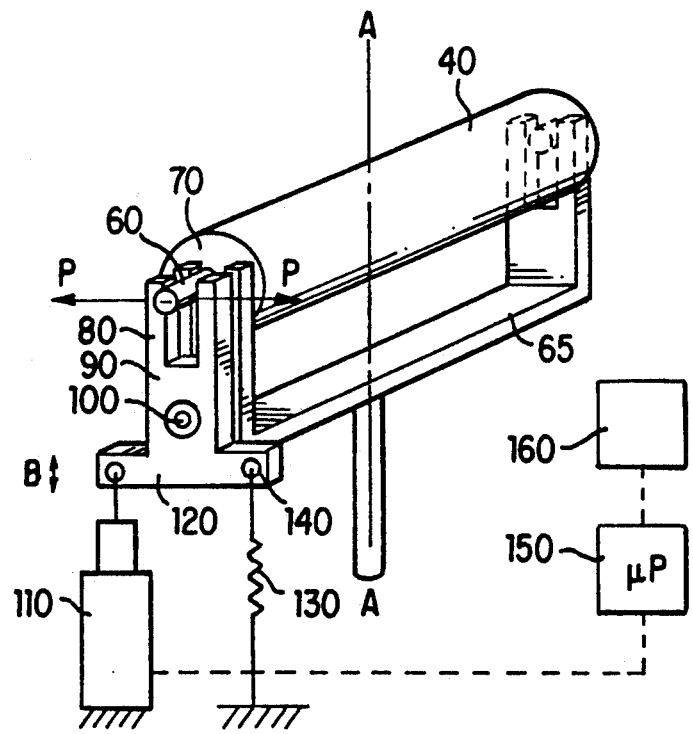
FIG. 4

LOW COST AND HIGH PRECISION SCHEME FOR PHOTORECEPTOR BELT STEERING CONTROL

BACKGROUND OF THE INVENTION

1. Field of the Invention

The present invention relates to an active belt steering control that minimizes lateral walk of the belt to within an allowable registration target tolerance. More particularly, it relates to a two position steering scheme yielding the advantages of absolute control.

2. Description of Related Art

The most effective means to steer a belt is by way of soft axis steering. That is, control or adjust the angle bisectrix axis of one of the rollers supporting the moving belt or web. Traditionally, two common control schemes are used for this steering: 1) absolute (continuously adjusted) soft axis angular position steering; and 2) two position (bang-bang) steering.

The absolute steering method controls the belt by adjusting the absolute soft axis tilt angle based on feedbacks of the belt lateral position and walk rate (which is the rate of lateral movement in one direction). The advantage of this method is precision which therefore make it suitable for multicolor printing or copying where registration of multiple passes is extremely critical. However, its disadvantages are the high cost of implementing an absolute soft axis tilt steering mechanism and the complication of potential nonlinearities in the design mechanics of the mechanism.

The two position steering method controls the belt by adjusting the soft axis tilt to either of two positions, one positive and one negative, based on the positional feedback of the belt as either left or right with respect to a fictitious plane. The advantages of the two position control are the simplicity and low cost of implementing a two position actuator mechanism. The disadvantage is that, heretofore, it has not provided the precision needed for color registration, and is only good for controlling the belt so that it will not walk away to one direction off the belt module.

U.S. Pat. No. 4,061,222 to Rushing discloses an apparatus for tracking an endless belt along an endless path by a tiltable belt steering roller whose position is continually adjusted so that the belt is maintained at a stable equilibrium position despite changes in the belt shape. The adjustment is determined by control circuitry which produces signals representative of lateral belt edge position, a desired belt edge position, and either a steering roller position or an instantaneous lateral belt deviation rate to produce a control signal which is applied to a gear motor to control the tilt angle of the steering belt roller. This apparatus utilizes the absolute control method.

U.S. Pat. No. 4,572,417 to Joseph et al discloses an apparatus for controlling lateral, cross track alignment of a web moving along a path to minimize lateral deviation between successive discrete areas of the web. A steering roller supports the web for movement along the path and is rotatable about an axis perpendicular to a plane of the span of the web approaching the steering roller.

U.S. Pat. No. 4,170,175 to Conlon, Jr. discloses a system for tracking an endless belt which automatically compensates for creep of the belt. The belt is supported by four rollers. A first is a drive roller, a second and third are idler rollers, and a fourth roller is an idler roller with flared ends. The flared roller provides passive tracking without electronic or active feedback. One of the idler rollers is spring loaded such that when an edge of the belt creeps up on one of the flared ends of the fourth roller, that side of the spring loaded roller is caused to tilt due to increased belt stiffness on that side. This positions the belt laterally toward a central position.

U.S. Pat. Nos. 4,174,171 and 4,344,693 to Hamaker disclose an apparatus for controlling the lateral alignment of a moving photoconductive belt. A resilient support constrains lateral movement of the belt causing a moment to be applied to a pivotably mounted steering post. As a result, the steering post pivots in a direction to restore the belt along a predetermined path. This apparatus is passive and provides no active electronic feedback.

U.S. Pat. No. 4,961,089 to Jamzadeh discloses a method and apparatus for controlling lateral movement of a web along an endless path. The lateral position of the web is monitored and a determination is made by a control unit if the web is within predetermined limits such that a copying operation can be completed while the web is still properly tracking. If the web is not tracking properly, or if it is predicted that the web will track beyond its predetermined lateral limits within a copying operation, a correcting step is taken prior to the copying operation. The correcting step determines a tilt angle for a steering roller. Upon completion of the correcting step, the apparatus returns to a monitoring capacity and does not provide corrective measures until the web is beyond or is predicted to go beyond the predetermined limits during a subsequent copying operation. This ensures that copying operations have proper registration and do not include corrective steps during the copying operation which might interfere with the registration. This apparatus uses an absolute scheme to determine corrective action.

In addition to electronic feedback active sensing of lateral position of the belt, some of the prior art described herein utilize mechanical elements which aid on controlling the belt such as resilient spring-loaded rollers and tapered rollers. While these reduce the cost of the apparatus, they are not of the precision to provide quality color registration.

Thus, the need exists for a low cost method and apparatus for controlling belt tracking which is precise enough to allow quality color registration, yet does not require complex steering mechanisms and controls.

OBJECTS AND SUMMARY OF THE INVENTION

It is an object of the present invention to provide a low cost method and apparatus for controlling lateral tracking of an endless belt with high precision minimizing both "belt walk" (lateral displacement) and "walk rate" (lateral velocity).

It is another object of the present invention to provide a belt tracking control scheme combining the attributes of absolute and two position control.

It is another object of the present invention to provide a belt tracking and controlling system which controls lateral belt movement of a photoreceptor belt in a color copier so that color images can be overlaid, one on top of the other, without exceeding allowable registration limits in a lateral direction.

In accordance with the present invention, the high precision belt tracking control apparatus and method comprise a plurality of rollers which support an endless belt. A steering roller is pivotable about a soft tilt axis pivotal about a midpoint of the longitudinal length of the steering roller between two positions, one positively tilted with respect to a fictitious plane and one negatively tilted. Based on feedbacks from the belt lateral position and walk rate, the present invention determines a duration ratio of keeping the soft axis tilt at the two positions, one negative and one positive, which in effect averages the equivalent required angle of tilt.

These and other objects will become apparent from a reading of the following detailed description in connection with the drawings.

BRIEF DESCRIPTION OF THE DRAWINGS

The invention will be described in detail with reference to the following drawings wherein:

FIG. 1 is a 3-dimensional view of an endless belt system according to the present invention;

FIG. 2A is a planar view taken along a soft axis of FIG. 1 which shows a two position method of steering control;

FIG. 2B is a planar view taken along a soft axis of FIG. 1 which shows an absolute (continuous) method of steering control;

FIGS. 3A and 3B are a representation of belt velocity vectors of the belt system of FIG. 1, and axis A is the so called soft axis;

FIG. 4 is a reprentation of a 2-position steering mechanism according to the present invention;

DETAILED DESCRIPTION OF PREFERRED EMBODIMENTS

Figure 5A:
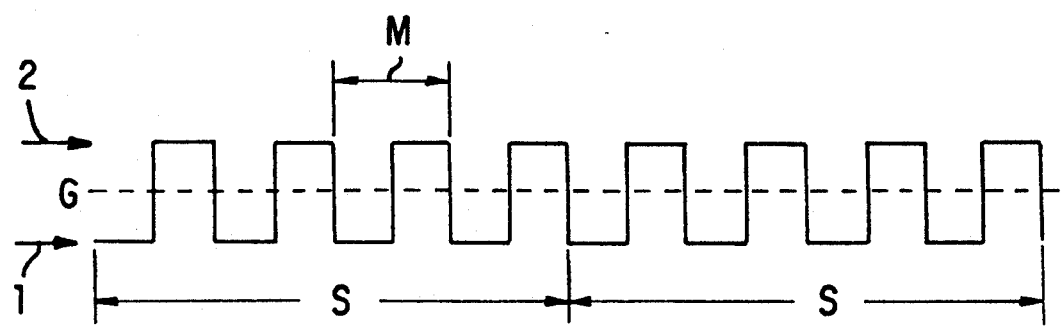
FIGS. 5A, 5B and 5C are timing diagrams showing various duty cycles at the two positions.

Reprographics of color images require that the positional registrations of the three primary, plus black, colors be within a 0.125 mm diameter error circle. Acceptable error within a belt module subsystem is dependent on the types of engines and architecture used, but in any case, it will account for less than the total of the budgeted 0.125 mm error circle.

Absolute lateral position of the belt to be controlled has little significance on image registration since it is the relative position between the images carried by the belt which affects errors in the composite.

As shown with reference to FIG. 1, there is shown an endless belt system 10, such as a photoreceptor belt used in a color copier, which includes three rollers 20, 30 and 40 which support an endless belt 50. Roller 20 is a drive roller which is driven by a motor (not shown). Roller 30 is an idler roller, although it may also be another drive roller if so desired. Roller 40 is a steering roller which is rotatable about a shaft 60 and capable of pivotal movement about a soft axis A, generally perpendicular to the longitudinal axis of shaft 60 bisecting the angle formed between the incoming and outgoing belt spans, and intersecting it at the midpoint of roller 40, to control steering of the endless belt 50. The roller 40 is fixed except for movement only in a plane P by attachment of ends thereof to a yoke 65 (see FIG. 4) which pivots about the soft axis. Although only three rollers are shown, the number is intended as illustrative and is not limited to three rollers, but may include any system with two or more rollers.

The most effective way to steer a rigid belt is by the method of "soft-axis" steering. A soft-axis tilt activated in the steering roll will result in an out-of-plane twist for both the incoming and outgoing belt spans. Consequently, a variation in the belt approaching angle towards the steering roller is affected.

As shown in FIGS. 2A and 2B, there are two methods of movement of the steering roller 40 about the soft steering axis A. FIG. 2A shows the two position method in which the steering roller 40 is pivoted between one of two positions, one position being positive relative to an imaginary bisecting plane I (for example the full line position), and the second position being negative with respect to the imaginary plane I (the dotted line position). FIG. 2B shows the absolute (continuous) method in which the steering roller 40 is pivoted between a continuously variable angle $\alpha$ relative to the imaginary plane I.

Based on a kinematic relationship, as shown in FIGS. 3A and 3B, lateral velocity $V_l$ is equal to the product of the resultant belt velocity $V_b$ and the sine of the belt approach angle $\beta$. The process velocity $V_p$ is equal to the product of the resultant belt velocity $V_b$ and the cosine of the belt approach angle $\beta$.

The walk rate (lateral velocity), defined as a nondimensional ratio of the belt lateral velocity with respect to the process velocity, becomes the tangent of the belt approach angle $\beta$. For small angles, as is usually the case, the walk rate is essentially the same as the approach angle.

In FIG. 4, an arrangement is shown for positioning the steering roller 40 between the two positions. Steering roller 40 is povotal about a soft axis A extending through a centerline of steering roller 40. The steering roller is constrained to movement only in a plane P by constraining means such as yoke 65 through which ends of shaft 60 can travel therein. The shaft 60 of steering roller 40 is connected at an end 70 thereof to a steering roller connecting portion 80 of linkage 90 and also constrained within one of the yoke ends 65. The end 70 may be connected to linkage 90 by pinning or other suitable methods. An opposite end of the shaft 60 is also constrained within a second yoke end 65. The linkage 90 is pivotal about a pivot point 100. A solenoid 110 is attached to linkage 90 at connecting portion 120. When actuated, the solenoid will exert a pulling force at connecting portion 120 overcoming the spring force to pivot roller end 70 to the left. A spring 130 used to return the end 70 to the right position upon deactuation of solenoid 110 is attached to linkage 90 at connecting portion 140. The solenoid 110 is positionable between a first position and a second position in a plane indicated with arrow B. The solenoid is actuated based on an output from a control unit which may be a microprocessor 150 which receives a signal from a sensor 160. Spring 130 and solenoid 110 are both connected to linkage 90 at locations spaced from the pivot point 100 such that a moment is applied to the linkage 90 to pivot the linkage 90 about pivot point 100. The spring 130 applies a moment opposite to the actuation force of the solenoid 110 to return the end 70 to the right position upon deactuation of solenoid 110. Pivoting of the linkage 90 about pivot 100 causes the end of shaft 60 to be moved along plane P.

Figure 5B:
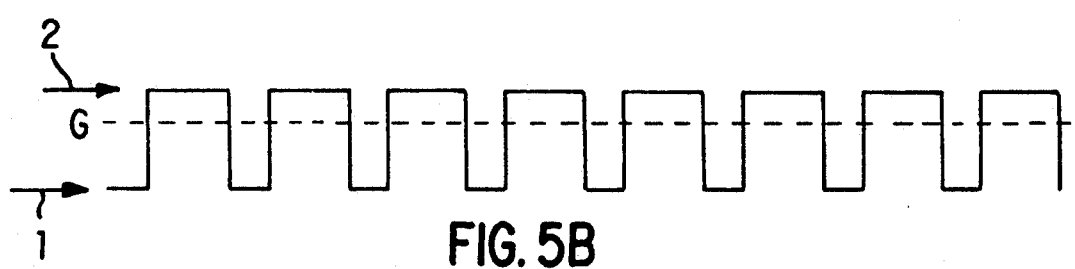
Figure 5C:
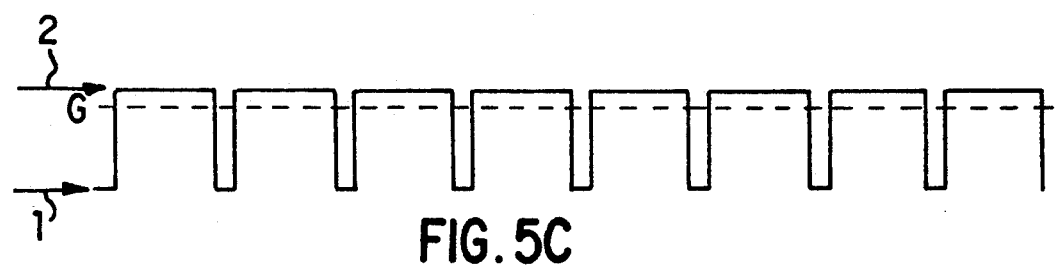

In accordance with the present invention, as shown in FIGS. 5A, 5B and 5C, there is shown a modulation period M and a sampling period S used in a control algorithm contained within the microprocessor 150 which controls movement of the steering roller 40 between the two positions. By controlling the duration of the steering roller 40 at the two positions, reliable belt steering can be provided.

As shown in FIG. 5A, the time duration for the steering roller at position 1, referred to as Tic, is made equal to the time duration for the steering roller 40 at position 2, referred to as Tac. As shown, this results in an average position G which is centrally located between the two positions. As shown in FIG. 5B, if the Tac time duration for the steering roller 40 at position 2 is increased, relative to the Tic time duration at position 1, the endless belt 50 now has an average position G which is shifted towards position 2. As shown in FIG. 5C, the Tac time duration is increased even further, resulting in an average position G which is yet closer to position 2. As shown, it becomes apparent that such a control can be utilized to maintain reliable belt steering with limited hardware and control. All that is necessary is a solenoid positionable between two positions, a sensor for monitoring belt lateral position, and simple control means for determining the time durations Tic and Tac which when implemented will correct belt alignment, i.e., correct both "walk rate" and "belt walk".

Although shown as having four modulation periods M within a sampling period S, depending on specific design criteria more or less modulation periods may be utilized. By varying the duty cycle with emphasis on either position 1 or position 2, various average positions of the steering roller 40 can be achieved for fine steering adjustments.

Figure 6:
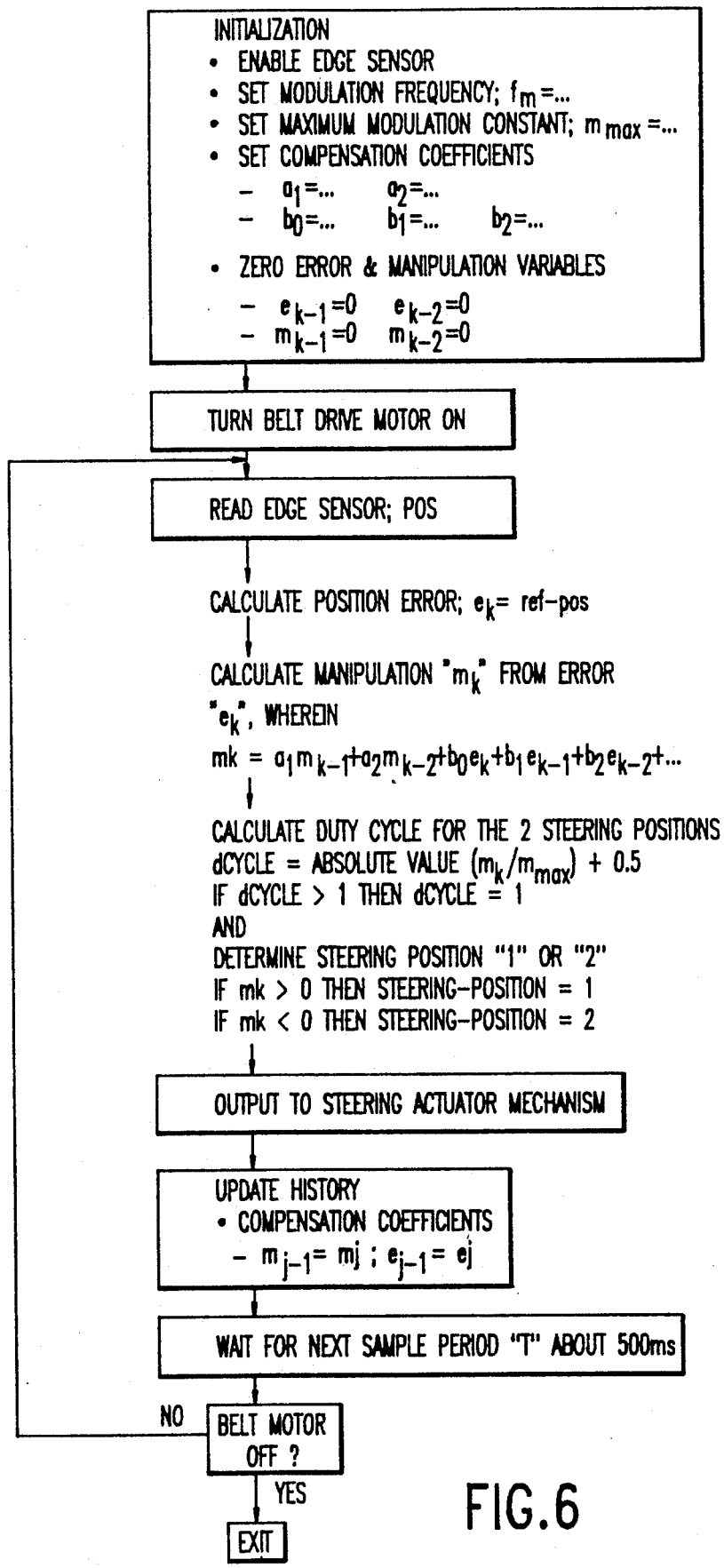
FIG. 6 is a flowchart showing a two position belt steering control.

With reference to FIG. 6, there is described an exemplary control algorithm which can be utilized by the control means which may comprise a microprocessor 150, a plurality of microprocessors, or a computer (FIG. 1).

As shown, an initialization sequence is enabled upon startup of the machine, which in the exemplary embodiment is an electrophotographic device, although any application utilizing an endless belt which requires precise lateral control is contemplated. A lateral belt position sensor 160, preferably a positional feedback sensor as exemplified by the use of an optical collomated beam interrupt sensor sensing a cutout target made of three slots in the belt as described in U.S. Ser. No. 07/859,746, filed Mar. 30, entitled "Apparatus for Transverse Image Registration of a Photoreceptor Belt", is enabled and numerous variables are set to predetermined values. Of these values, a modulation frequency $f_m$ is set to a suitable value which is a function of the belt size and speed and a maximum modulation constant $m_{max}$ is set equal to two times the largest anticipated manipulation value. Compensation coefficients are set equal to predetermined values and the initial error and manipulation values are set equal to zero.

A belt drive motor (not shown) is turned on which activates and starts movement of endless belt 50. The belt lateral position is sensed as cutout target 170 passes by optical sensor 160 (FIG. 1). The target 170 passes the sensor 160 once per revolution of belt 50. The sensor 160 sends a signal to microprocessor 150.

Positional error is then calculated based on a reference positional value. The positional error is represented as $e_k = ref - pos$. Manipulation value $m_k$ is calculated from the error $e_k$ based on the generalized "$k^{th}$" order feedback and control compensation known in the art.

Next, a duty cycle for the two steering positions is determined. The duty cycle is determined as follows:

$$dcycle = \text{absolute value } (m_k/m_{max}) + 0.5$$

If the duty cycle dcycle is greater than 1, then the duty cycle is set equal to 1, i.e., the steering roller 40 stays at one of the two positions for the entire modulation period. A steering position "1" or "2" is then determined. If $m_k > 0$ then the steering position is set equal to 1. If $m_k < 0$ then the steering position is set equal to 2. These variables are then output and utilized by the steering actuator mechanism, i.e., solenoid 110 to position the solenoid 110 at the proper position, either position 1 or 2 depending on the variables, for a required first time period determined by the duty cycle. After the determined first time period at the selected position is exhausted, either position 1 or 2, the solenoid 110 positions the steering roller 40 to the other of the two positions for a second time period. The sum of the first and second time periods equals the modulation period M and the first time period divided by the modulation period equals the duty cycle ratio. This movement of the steering roller from one position to the other continues for an entire sampling period S which may be one or more modulation periods M.

After the duty cycle has been determined, the compensation coefficients are then updated. In a preferred example, the sampling period S is about 500 ms, although the sampling period can very greatly depending on the application and the equipment used. The algorithm then checks if the belt motor is turned off. If it is, then the process is completed. If not, the algorithm returns to reading the edge sensor 150 value on the next revolution of the belt 50 and the process is repeated. A new duty cycle is then calculated based on the updated coefficients and the new edge sensor value.

The TicTac implementation is essentially a first order system and is more linear than prior systems and does not usually have nonlinearities associated with the absolute control such as backlashes in the soft tilt axis.

The invention has been described with reference to the preferred embodiments thereof, which are illustrative and not limiting. Various changes may be made without departing from the spirit and scope of the invention as defined in the appended claims.

What is claimed is:

1. A control apparatus for tracking an endless belt moving along a predetermined path of movement comprising:

a roller for supporting said belt, said roller being mounted to rotate about a fixed axis;

a belt steering roller for supporting said belt, a span of said belt defined between said roller and said belt steering roller travelling in a plane, said belt steering roller being adapted for rotational movement about a first axis perpendicular to the plane and tilting movement through a midpoint of said belt steering roller in a soft tilt axis along said first axis;

tilting means for tilting said steering roller about said soft tilt axis to one of two predetermined positions, one of said positions being positively tilted relative to the plane and the other position being negatively tilted relative to the plane;

means for sensing the lateral position of said belt for producing an electrical signal representing said lateral position;

means for analyzing said electrical signal and determining a first and second time period, said first and second time periods forming a time duration ratio for maintaining said steering roller at said negatively and positively tilted positions;

control means for activating said tilting means to move said steering roller to one of said two predetermined positions based on said electrical signal for said first time period determined by said analyzing means and subsequently activating said tilting means to move to the other of said two positions after elapse of said first time period to control lateral tracking of said belt, said steering roller remaining at the other of said two predetermined positions for said second time period.

2. The control apparatus of claim 1, wherein said tilting means comprises a solenoid.

3. The control apparatus of claim 1, wherein said tilting means comprises a solenoid and a spring for providing an opposing force to said solenoid.

4. The control apparatus of claim 1, wherein the sum of said first and second time period equals a modulation period and wherein said time duration ratio is the relative time duration of the steering roller at said two positions during said modulation period.

5. The control apparatus of claim 4, wherein said sensing means senses said lateral position of said belt one time per sampling period, said sampling period being longer than said modulation period, and said control means alternately moves said steering roller between said two positions based on said time duration ratio for said sampling period.

6. The control apparatus of claim 5, wherein upon completion of said sampling period, a subsequent lateral position is sensed producing a subsequent electrical signal, said analyzing means determines a subsequent first and second time period and a subsequent time duration ratio, and said control means activates said tilting means based on said subsequent time duration ratio.

7. The control apparatus of claim 1, wherein said analyzing means includes updatable compensation coefficients to determine said time duration ratio.

8. The control apparatus of claim 1, wherein said control means is a microprocessor.

9. A method for controlling the lateral tracking of an endless belt moving along a predetermined path of movement around at least one support roller and a belt steering roller tiltable about a soft axis between negatively and positively tilted positions, said method comprising the steps of:

sensing the lateral position of said belt and producing an electrical signal representing said lateral position;

analyzing said electrical signal and determining a first and second time period, said first and second time period forming a time duration ratio for keeping said steering roller at said negatively and positively tilted positions;

activating a tilting means to move said steering roller to one of said positions based on said electrical signal for said first time period and subsequently activating said tilting means to move to the other of said positions after elapse of said first time period to control lateral tracking of said belt, said steering roller remaining at the other of said positions for said second time period.

10. The method of claim 9, wherein said analyzing step including determining of a first and second time period is determined by analyzing updatable error and manipulation coefficients and said electrical signal.

11. The method of claim 9, wherein the sum of said first and second time period is a modulation period and said activating said tilting means between said positions continues for a sampling period which is an integer multiple of said modulation period.

* * * * *

UNITED STATES PATENT AND TRADEMARK OFFICE
CERTIFICATE OF CORRECTION

PATENT NO. : 5,225,877
DATED : July 6, 1993
INVENTOR(S) : Lam Fun WONG

It is certified that error appears in the above-indentified patent and that said Letters Patent is hereby corrected as shown below:

On the title page, Item [54] change "LOW COST AND HIGH PRECISION SCHEME FOR PHOTORECEPTOR BELT STEERING CONTROL" to --LOW COST AND HIGH PRECISION APPARATUS AND METHOD FOR PHOTORECEPTOR BELT STEERING CONTROL--.

Signed and Sealed this

Twenty-fifth Day of January, 1994

Attest:

BRUCE LEHMAN

*Attesting Officer*   *Commissioner of Patents and Trademarks*